United States Patent
Dulkin et al.

(10) Patent No.: US 9,876,804 B2
(45) Date of Patent: Jan. 23, 2018

(54) METHOD AND SYSTEM FOR DETECTING UNAUTHORIZED ACCESS TO AND USE OF NETWORK RESOURCES

(71) Applicant: Cyber-Ark Software Ltd., Petach-Tikva (IL)

(72) Inventors: Andrey Dulkin, Herzlia (IL); Yair Sade, Herzlia (IL); Roy Adar, Kiryat-Tivon (IL)

(73) Assignee: Cyber-Ark Software Ltd., Petach-Tikva (IL)

( * ) Notice: Subject to any disclaimer, the term of this patent is extended or adjusted under 35 U.S.C. 154(b) by 184 days.

(21) Appl. No.: 14/058,254

(22) Filed: Oct. 20, 2013

(65) Prior Publication Data

US 2015/0113600 A1   Apr. 23, 2015

(51) Int. Cl.
*H04L 29/06* (2006.01)

(52) U.S. Cl.
CPC ........ *H04L 63/1416* (2013.01); *H04L 63/102* (2013.01); *H04L 63/1466* (2013.01)

(58) Field of Classification Search
CPC ..... H04L 63/10; H04L 63/101; H04L 63/102; H04L 63/104; H04L 63/105; H04L 63/1408; H04L 63/1416; H04L 63/1425; H04L 63/1433; H04L 63/1441; H04L 63/1466

See application file for complete search history.

(56) References Cited

U.S. PATENT DOCUMENTS

| | | | |
|---|---|---|---|
| 7,103,679 B2 | 9/2006 | Bonn | |
| 7,571,488 B2 * | 8/2009 | Oho | G06F 21/606 705/51 |
| 8,082,349 B1 | 12/2011 | Bhargava et al. | |
| 8,082,590 B2 | 12/2011 | Kim et al. | |
| 8,392,963 B2 * | 3/2013 | Shulman | H04L 63/08 726/2 |
| 8,429,708 B1 * | 4/2013 | Tandon | G06F 21/31 380/247 |
| 8,478,708 B1 | 7/2013 | Larcom | |
| 8,701,167 B2 * | 4/2014 | Kovalan | G06F 19/321 713/193 |
| 8,909,247 B2 * | 12/2014 | Tipton | H04W 12/08 455/456.1 |
| 9,037,849 B2 * | 5/2015 | Koster | H04L 63/0823 713/156 |

(Continued)

FOREIGN PATENT DOCUMENTS

WO   WO 2011/018736   2/2011

OTHER PUBLICATIONS

Official Action dated Jun. 17, 2015 From the US Patent and Trademark Office Re. U.S. Appl. No. 14/061,835.

(Continued)

*Primary Examiner* — Zachary A Davis

(57) ABSTRACT

Methods and systems are disclosed for detecting unauthorized actions associated with network resources, the actions including access to the resource and activity associated with the resource. The unauthorized actions are detected by analyzing action data of a client action associated with the network resource against credential retrieval data including records of authorized actions and/or procedures for performing an action associated with the network resource.

18 Claims, 8 Drawing Sheets

(56) References Cited

U.S. PATENT DOCUMENTS

| | | |
|---|---|---|
| 2003/0191627 A1 | 10/2003 | Au |
| 2006/0080410 A1 | 4/2006 | McIarty et al. |
| 2007/0050587 A1* | 3/2007 | Palapudi ............... G06F 3/0622 711/164 |
| 2007/0199068 A1 | 8/2007 | Russinovich et al. |
| 2007/0204257 A1 | 8/2007 | Kinno et al. |
| 2007/0294187 A1 | 12/2007 | Scherrer |
| 2008/0222706 A1 | 9/2008 | Renaud et al. |
| 2008/0263661 A1 | 10/2008 | Bouzida |
| 2009/0222304 A1 | 9/2009 | Higgins et al. |
| 2009/0271863 A1 | 10/2009 | Govindavajhala et al. |
| 2009/0293121 A1 | 11/2009 | Bigus et al. |
| 2010/0037166 A1 | 2/2010 | Chandrasekar et al. |
| 2010/0158220 A1 | 6/2010 | Silverman |
| 2010/0218233 A1* | 8/2010 | Henderson ............... G06F 21/46 726/1 |
| 2011/0247059 A1* | 10/2011 | Anderson ............... G06F 21/62 726/6 |
| 2011/0257992 A1 | 10/2011 | Scantland et al. |
| 2012/0005192 A1 | 1/2012 | Bao et al. |
| 2012/0036255 A1 | 2/2012 | Polsky |
| 2013/0007883 A1 | 1/2013 | Zaitsev |
| 2013/0305357 A1* | 11/2013 | Ayyagari ............... H04L 63/14 726/22 |
| 2014/0033307 A1 | 1/2014 | Schmidtler |
| 2015/0121461 A1 | 4/2015 | Dulkin et al. |
| 2015/0121518 A1 | 4/2015 | Shmueli et al. |
| 2015/0304349 A1 | 10/2015 | Bernstein et al. |
| 2016/0112397 A1* | 4/2016 | Mankovskii ......... H04L 63/083 726/6 |
| 2016/0142435 A1 | 5/2016 | Bernstein et al. |

OTHER PUBLICATIONS

Cyber-Ark "Application Password Management", Cyber-Ark Software Ltd., Datasheet, 2 P., Feb. 2007.

Cyber-Ark "Enterprise Password Vault™ 4.5", Cyber-Ark Software Ltd., Brochure, 4 P., Nov. 2007.

Cyber-Ark "On-Demand Privileges Manager™", Cyber-Ark Software Ltd., Brochure, 2 P., Apr. 2010.

Cyber-Ark "Privileged Identity Management 5.0", Cyber-Ark Software Ltd., Brochure, 4 P., Apr. 2009.

Cyber-Ark "Privileged Session Manager™", Cyber-Ark Software Ltd., Datasheet, 2 P., Mar. 2009.

European Search Report and the European Search Opinion dated Mar. 3, 2015 From the European Patent Office Re. Application No. 14190036.5.

European Search Report and the European Search Opinion dated Feb. 20, 2015 From the European Patent Office Re. Application No. 14187430.5.

Official Action dated Jan. 29, 2016 From the US Patent and Trademark Office Re. U.S. Appl. No. 14/524,145.

Applicant-Initiated Interview Summary dated Apr. 7, 2016 From the US Patent and Trademark Office Re. U.S. Appl. No. 14/524,145.

Official Action dated May 5, 2016 From the US Patent and Trademark Office Re. U.S. Appl. No. 14/253,945.

Restriction Official Action dated May 12, 2016 From the US Patent and Trademark Office Re. U.S. Appl. No. 14/540,289.

Official Action dated Sep. 14, 2015 From the US Patent and Trademark Office Re. U.S. Appl. No. 14/253,945.

\* cited by examiner

METHOD AND SYSTEM FOR DETECTING UNAUTHORIZED ACCESS TO AND USE OF NETWORK RESOURCES

TECHNICAL FIELD

The present invention is directed to detecting unauthorized access to and use of resources on a network.

BACKGROUND

Privileged accounts are accounts defined in machines, systems, and applications, that have high operation permissions. Privileged operation on many resources, which are on, or otherwise linked to a network, are only enabled by employing privileged accounts. Unauthorized use of a privileged account, and subsequent unauthorized access to a network resource, creates a legal liability and a business risk for an organization, as well as a security risk. Additionally, such unauthorized access may be indicative of an attack, for example, a hack, on the target resource of the enterprise.

Privileged accounts include shared and administrative accounts, including accounts used by service providers. Exemplary privileged accounts include root accounts, which are the most privileged accounts on Unix systems. A root account provides its users with the ability to carry out all aspects of system administration, such as adding, changing, terminating or deleting user accounts, changing user passwords, examining log, files, and installing software. Accordingly, the user, for example, the person or entity, with the root account, has almost absolute control over the system or resource which he has accessed via the root account. Another example of privileged accounts is the Local Administrator or the Domain Administrator accounts in Windows® machines and networks. Still other privileged accounts include administrator accounts for an organization's machines and/or applications and/or services in the cloud, which reside outside the organization's network.

Privileged accounts, such as root accounts, are often shared by groups of systems administrators. With privileged access to a group of individuals or entities, there is presented a challenge in action attribution, access control, activity monitoring, and other aspects of privileged account management. Moreover, many government and corporate regulations require that privileged accounts be managed, so that access is controlled, limiting unauthorized access and damage to the systems or resources, through which access is granted via the privileged accounts.

SUMMARY

Embodiments of methods and systems are disclosed for detecting unauthorized actions associated with network resources, the actions including access to the resource and activity associated with the resource. The unauthorized actions are detected by analyzing action data of a client action associated with the network resource against a predetermined policy, rule, and/or protocol, for the authorized performance of the action associated with the resource.

Some embodiments of the present invention are directed to management of accounts for resources, and determining if the access to the account is proper and authorized. Some embodiments of the present invention provide for access management to accounts for resources, in accordance with system rules and policies, for the authorized access to and use of accounts, for the requisite resource.

Some embodiments of the present invention are directed to detecting unauthorized access and subsequent unauthorized use of a target resource by analyzing user access and/or user actions. The user access is analyzed based on the user connecting with a privileged account to the target resource. User actions are analyzed based on actions associated solely with privileged accounts, which should not be performed for non-privileged accounts.

Some embodiments are directed to adding another layer on top of an authorization layer for accounts, for example, privileged accounts. This additional layer includes a correlation layer, where the presence or absence of a correlation between data for an actual action associated with a resource is correlated with credential retrieval data indicative of historical retrieval actions for that same resource. Coupled with a proper authorization from the authorization layer, the presence of a correlation indicates that the action associated with the resource is authorized. However, should a correlation be absent, the action associated with the resource is not authorized.

Optionally, some embodiments of the present invention are installed and implemented externally from the target resource.

Additional embodiments are directed to detecting abuse of privileged accounts and unauthorized privilege escalation, and taking action to stop the abuse and privilege escalation of actions associated with a resource when detected. This detection of privileged account abuse is accomplished by the provision of an additional layer or control process, in addition to a standard authorization layer or process. The additional layer or control process correlates client actions, such as actual client access and client activity (usage), with information stored in the system. This stored information includes rules and policies, procedures, protocols and the like, for authorized performance of the detected client actions. This enables detection and mitigation of unauthorized activity that has bypassed or circumvented the standard authorization layer or process associated with the resource.

Still other embodiments are directed to methods and systems for detecting unauthorized actions associated with network resources, the actions including access to the resource and activity associated with the resource. The unauthorized actions are detected by analyzing action data of a client action associated with the network resource against credential retrieval data including records of authorized actions and/or procedures for performing an action associated with the network resource.

Throughout this document, a "network resource" includes any server, computer, computer system, computer device, computer component or module, network device, mobile device, machine, engine, software, application, or other hardware or software, or combinations thereof, or the like, which is linked either directly or indirectly to a communications network, the communications network, such as a Local Area Network (LAN), Wide Area Network (WAN), including public networks such as the Internet.

Throughout this document, a "target resource" includes any aforementioned "network resource," which requires authentication and the grant of operation privileges in accordance with an account, i.e., a privileged account. The privileged accounts for the "target resources" are managed by a Privileged Account Management System (PAMS), detailed below. "Target resources" include machines, applications, application servers, and other systems which require account authentication and grant operation privileges in accordance with the corresponding privileged account.

Exemplary "target resources" include execution environments, operating systems, such as Linux®, application servers, and applications, including web applications.

Throughout this document, a "machine" refers to an execution environment, for example, for computer software, programs and the like, including a physical or virtual hardware environment and an operating system. Examples of "machines" include computers and computing or computer systems (for example, physically separate locations or devices), servers, computer and computerized devices, processors, processing systems, computing cores (for example, shared devices), and similar systems, modules and combinations of the aforementioned.

A "privileged account" includes an account defined in a machine or system, which holds high operation permissions, and is any account where privileges are defined under one or more rules. A "privileged account" may be a shared account. One such privileged account is a "root account," which for example, on a Linux machine enables the user to have complete access to all resources and available operations for the machine. Privileged accounts include, for example, shared and administrative accounts, application and machine accounts, and accounts used by service providers.

"Privilege Escalation" occurs when a non-privileged or lower privileged user accesses machine function or content which is reserved for higher privileged users or applications, with corresponding privileged accounts. Such higher privileged users and applications may be those with root accounts, or other accounts enabling higher-level access to resources and operations available for the machine.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Embodiments of the invention are directed to a computer-implemented method performed by a computer system for detecting the authorization status of an action associated with a resource accessible via a network. The method comprises receiving, by a computer system, action data of an action associated with a resource accessible via the network; obtaining, by the computer system, credential retrieval data for an account associated with the resource, the credential retrieval data indicative of at least one historical credential retrieval action associated with the resource; and analyzing, by a processor, the received action data and the obtained credential retrieval data for the presence or absence of a correlation therebetween, the presence or absence of the correlation indicative of an authorization status of the action associated with the resource.

Optionally, the computer system is linked to the network and the action data is received over the network.

Optionally, if there is a correlation that the action was performed by the client in accordance with the credential retrieval data for the resource, the action performed by the client is authorized.

Optionally, the credential retrieval data is obtained from an account management system.

Optionally, if there is not a correlation that the action was performed by the client in accordance with the credential retrieval data, the action performed by the client is unauthorized.

Optionally, if the action performed by the client is unauthorized, the computer system takes further action.

Optionally, the further action is selected from the group consisting of: providing a notification to one or more machines that there is unauthorized action associated with the resource, and changing the operation of the resource.

Optionally, the action includes access to the resource.

Optionally, the action includes activity associated with the resource.

Optionally, the method additionally comprises obtaining preconfigured policies for the action associated with the resource; and the analyzing by the processor additionally includes analyzing the received action data and the obtained preconfigured policies for the action for the presence or absence of a correlation therebetween, the presence or absence of the correlation indicative of an authorization status of the action associated with the resource.

Optionally, the account associated with the resource includes a privileged account.

Optionally, the privileged account is managed by a privileged account management system.

Optionally, the credential retrieval data is obtained from the privileged account management system.

Optionally, the action includes using the privileged account to access the resource.

Optionally, the activity includes a privileged use of the resource by a non-privileged user process.

Optionally, the resource is selected from the group consisting of: servers, computers, computer systems, computer devices, mobile devices, network devices, databases, computer components, computer modules, machines, engines, software, applications, and combinations thereof.

Embodiments are also directed to a computer system for detecting the authorization status of an action associated with a resource accessible via a network. The computer system comprises a storage medium for storing computer components; and a computerized processor for executing the computer components. The computer components comprise a computer module configured for: 1) receiving action data of a client performing an action associated with a resource accessible via the network; 2) obtaining credential retrieval data for an account associated with the resource, the credential retrieval data indicative of at least one historical credential retrieval action for an account associated with the resource; and 3) analyzing the received action data and the obtained credential retrieval data for the presence or absence of a correlation therebetween, the presence or absence of the correlation indicative of an authorization status of the action associated with the resource.

Optionally, the computer module is additionally configured for: determining that the action performed by the client is authorized, when there is a correlation that the action was performed in accordance with the credential retrieval data indicative of at least one historical credential retrieval action for an account associated with the resource, for the authorized performance of the action.

Optionally, the computer system additionally comprises a privileged account management system configured for holding and maintaining credential retrieval data for the account associated with the resource.

Optionally, the computer module is additionally configured for: determining that the action performed by the client is not authorized, when there is not a correlation that the action was performed by the client in accordance with the credential retrieval data indicative of at least one historical retrieval action for an account associated with the resource, for the authorized performance of the action.

Optionally, the computer module is additionally configured for taking further action when the action performed by the client is unauthorized.

Optionally, the computer module is additionally configured for taking further action by at least one of: changing the operation of the network resource; and informing a third computerized module, configured for sending alerts of the unauthorized action associated with the resource, to locations internal and external to the computer system, to send alerts of the unauthorized action associated with the resource to locations internal and external to the computer system.

Other embodiments are directed to a computer usable non-transitory storage medium having a computer program embodied thereon for causing a suitable programmed system to detect the authorization status of an action associated with a resource, accessible via a network, by performing the following steps when such program is executed on the system. The steps comprise: receiving action data of a client performing an action associated with a resource accessible via the network; obtaining credential retrieval data for an account associated with the resource, the credential retrieval data indicative of at least one historical credential retrieval action for an account associated with the resource; and analyzing the received action data and the obtained credential retrieval data for the presence or absence of a correlation therebetween, the presence or absence of the correlation indicative of an authorization status of the action associated with the resource.

BRIEF DESCRIPTION OF THE DRAWINGS

Some embodiments of the present invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 4A-1 is a diagram of the architecture of the system and a target resource, according to some embodiments of the present invention;

FIG. 4A-2 is a diagram of an alternative architecture of the system and a target resource, according to some embodiments of the present invention;

DETAILED DESCRIPTION OF THE DRAWINGS

Figure 1:
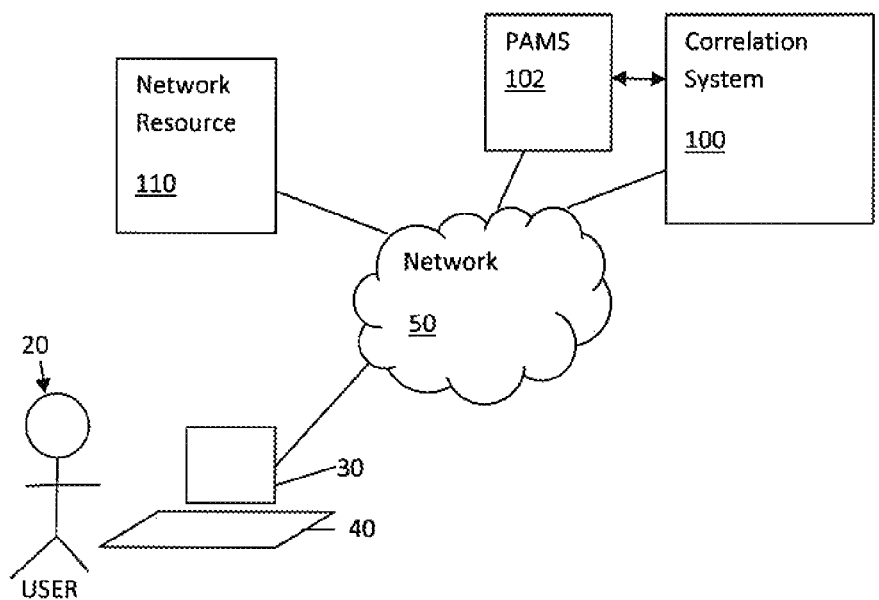
FIG. 1 is a diagram of an exemplary environment in which embodiments of the present invention are performed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which shows an operating environment for a non-limiting exemplary system 100, also known a Correlation System, in accordance with some embodiments of the present invention. The correlation system 100 is shown linked over a network 50, either directly or indirectly, or directly connected (shown by the double headed arrow), to a Privileged Account Management System (PAMS) 102. The PAMS 102 is also linked to the network 50. The PAMS 102 stores and manages data for and usage of privileged accounts, as well as other restricted access accounts.

The correlation system 100 is, for example, a computer system, implemented in a user-server configuration according to some embodiments of the present invention and addressable over a network 50, such as a Local Area Network (LAN), Wide Area Network (WAN), including public networks such as the Internet, using a client computer (or client) 40 and display 30, with which a user 20, representative of all users, both authorized and unauthorized for the network resource 110, interacts. Other users 20 may be system administrators and the like, and are identified as such.

The system 100 utilizes hardware, software and combinations thereof, for detecting abuse of accounts for network resources, including target resources, as well as unauthorized access and use (activity) of such network resources, including target resources. While numerous components are detailed below, numerous servers, machines, devices, computer systems and the like may be linked, either directly or indirectly, to the network 50, for operation with the exemplary system 100.

A network resource 110 is representative of multiple network resources, and links either directly or indirectly to the network 50. The network resource 110 maps back to the system 100. The network resource 110 may also be directly connected to the system 100. The network resource 110, for example, is typically a target resource 110' (shown specifically in FIGS. 3A, 4A-1 and 4A-2), and accordingly, "network resource" and "target resource" are used interchangeably, below. While the network resource 110 is shown as a single device or machine, it may be a plurality of devices or machines.

PAMS 102 is typically external with respect to the correlation system 100, as shown in FIGS. 1, 2, 3A, 4A-1 and 4A-2. PAMS 102 may be of singular or multiple components, as it may be formed of a plurality of computers, machines, devices, storage media, processors, devices, and other components, either directly connected to each other or linked together via the network 50. The PAMS 102 may be hardware, software, or combinations thereof.

The PAMS 102 is a system that, for example, manages privileged accounts, and other restricted access, associated with various network resources, for example target resources 110' linked to the network 50. The managed privileged accounts are administered by PAMS 102 in accordance with organizational rules and policies for each target resource, such as target resource 110'. PAMS 102 manages, for example, user authentication, mapping of users to the privileged accounts (for the specific resource) they are authorized to use, and logging the usage of the privileged accounts.

PAMS 102 is a system for managing privileged accounts. This system holds the credentials for privileged accounts and a mapping of users, for example, system administrators, permitted to access the specific privileged accounts, according to respective organization-defined policies. When a user wants to use a specific target account, for example, the root account of a Linux machine, the user authenticates to PAMS 102, and then retrieves credentials for the target account, and uses these credentials to access the target account. Some PAMS 102 systems enable additional connection methods, such as establishing a connection to the target resource, without disclosing the credentials to the user. An important aspect of PAMS 102 is the support of various workflows, for example managerial approval for password retrieval, correlation with ticketing systems, one-time passwords and password replacement. These aspects of PAMS 102 support organizational policies and procedures for network security and access control.

PAMS 102 includes storage, or links to storage, for credential retrieval data. Credential retrieval data includes, for example, data indicative of historical credential retrieval actions, and other historical data. Credential retrieval data includes, for example, records for password or certificate requests, requests to perform actions associated with the target resource 110' (FIGS. 3A, 4A-1 and 4A-2), activity logs of credentials requests and activities requested to be performed which are associated with the target resource 110'.

The credential retrieval data may also include records of requests for privilege escalation for a resource, by non-privileged account holders. This request can be enabled by an agent 462 (FIG. 4A-2), detailed below, deployed on the target resource 110'. Still other credential retrieval data may include records for requests for managerial approvals for a privileged action, i.e., access or activity, records limiting time and origins of privileged access, records for coordinating with an organizational ticketing system, and records for dual control of accounts on computers, machines and the like.

PAMS 102 may also be configured to provide additional functionality, going beyond controlling access by privileged accounts, to controlling the activity performed on target resources by the privileged accounts. For example, when a user is operating with a non-privileged user account on a Linux machine, and attempts to perform a privileged operation, such a PAMS can both provide the user with the relevant privileged account and verify that the activity the user attempts to perform is an allowed activity for this user. The latter is done by verifying user attempted activity against a policy stored in PAMS. This PAMS 102 controls such privileged activity, and also stores the policies, which describe the permitted privileged activity for every user and the limitations or conditions for these activities. The PAMS 102, may be, for example, a system commercially available as PIM (Privileged Identity Management)/PSM (Privileged Session Management) Suite, from CyberArk, www(dot)cyberark(dot)com.

Figure 2:
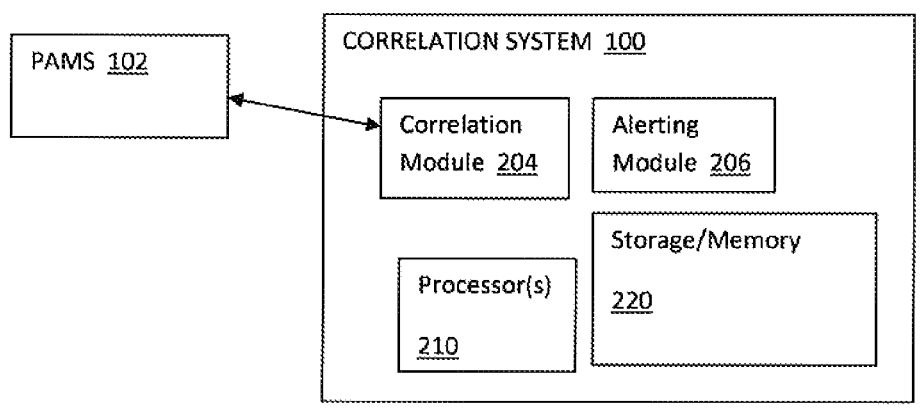
FIG. 2 is a diagram of the architecture of the system on which embodiments of the present invention are performed.

FIG. 2, to which attention is now directed, shows the architecture of the correlation system 100 for the network resource 110. The correlation system 100 couples with the network resource 110, for example, either linked via the network 50 or through a direct connection. As the network resource 110 is, for example, a target resource 110' (FIGS. 3A, 4A-1 and 4A-2), it is accessed, for example, through privileged accounts. The data or information for such privileged accounts is stored, for example, in a PAMS 102.

The correlation system 100 is also associated with a detection module 350, 450 and optionally, an interference module 360, 460, both of which are associated with the target resource 110'. The detection modules 350, 450 and interference modules 360, 460, are shown in detail with the target resource 110' in FIGS. 3A, 4A-1 and 4A-2 respectively, and described in detail below. The detection module 350, 450 and interference module 360, 460 are discussed with respect to the correlation system 100 of FIG. 2 in order to describe the correlation system 100, and its components 204, 206, 210, 220.

The correlation system 100 is also associated with a detection module 350, 450 and optionally, an interference module 360, 460, both of which are associated with the target resource 110'. The detection modules 350, 450 and interference modules 360, 460, are shown in detail with the target resource 110' in FIGS. 3A, 4A-1 and 4A-2 respectively, and described in detail below. The detection module 350, 450 and interference module 360, 460 are discussed with respect to the correlation system 100 of FIG. 2 in order to describe the correlation system 100, and its components 202, 204, 206, 210, 220.

The processors 210 control the operation of the correlation system 100. The processors 210 are conventional processors, such as those used in servers, computers, and other computerized devices. The processors 210 may be arranged to have a central processing unit (CPU), for controlling the correlation system 100. For example, the processors may include x86 Processors from AMD and Intel, Xenon® and Pentium® processors from Intel, and other processors. Other processors, such as those of the modules, may be any of the aforementioned processors.

The storage/memory 220 is any conventional storage. The modules 204, 206 may also include their own storage/memory in addition to the storage memory 220. This storage/memory 220 stores machine executable instructions associated with the operation of PAMS 102 and the modules 204, 206. Also, the storage/memory 220, although shown as a single component for representative purposes, may be multiple components, and may be outboard from the system 100, and linked to the network 50.

The correlation module 204 is linked to a detection module 350 (FIG. 3A), 450 (FIGS. 4A-1, 4A-2) for the target resource 110' and PAMS 102. The correlation module 204 receives action data from the detection module 350, 450, and obtains information associated with the action from PAMS 102. The correlation module 204 checks whether the privileged connection or activity, represented by the action data received from the detection module 350, 450 was performed in accordance with the credential retrieval data and records thereof, which is established through PAMS 102. This correlation can be considered a second security layer, which is used on top of the first or base layer, provided by PAMS 102.

Figure 3A:
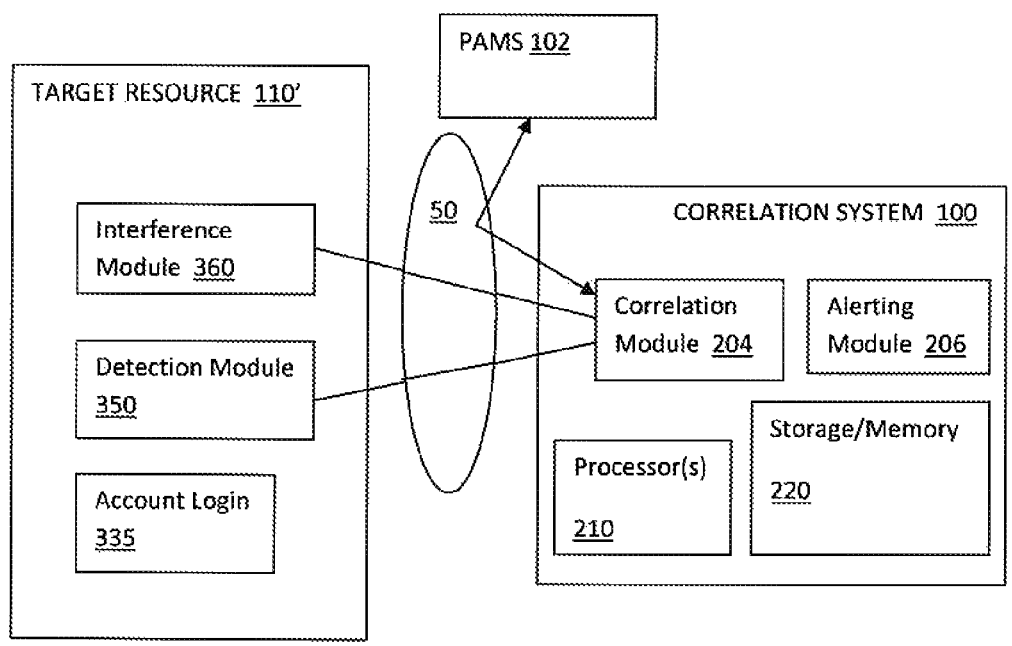
FIG. 3A is a diagram of the architecture of the system and a target resource, according to some embodiments of the present invention.
Figures 1, 4A:
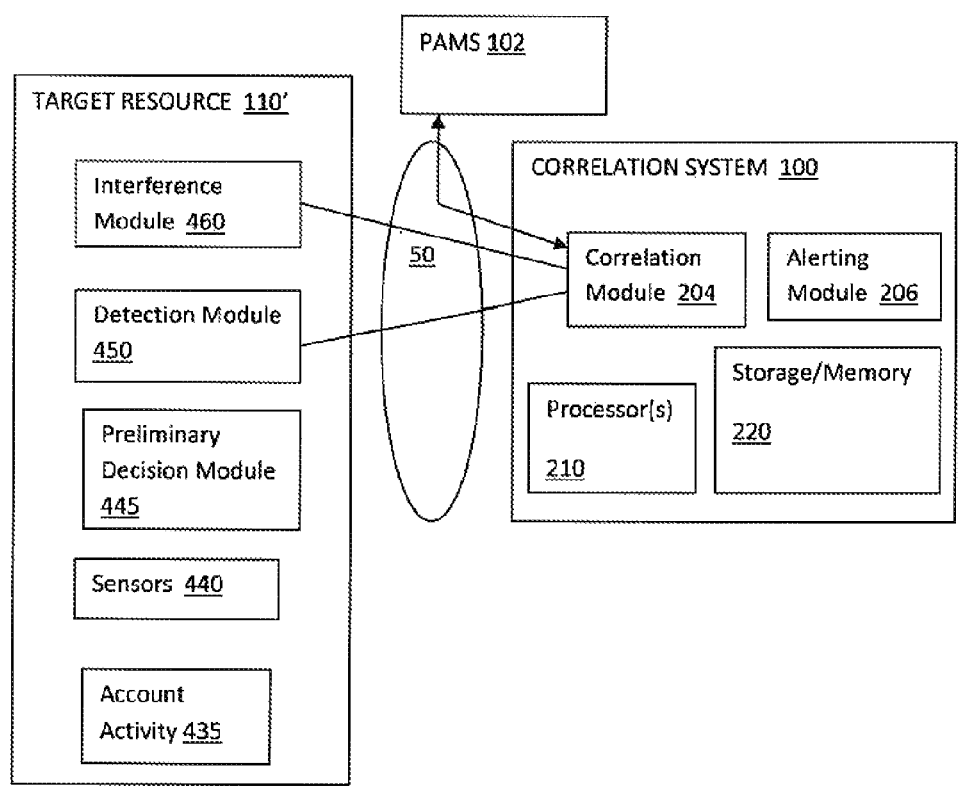
Figures 2, 4A:
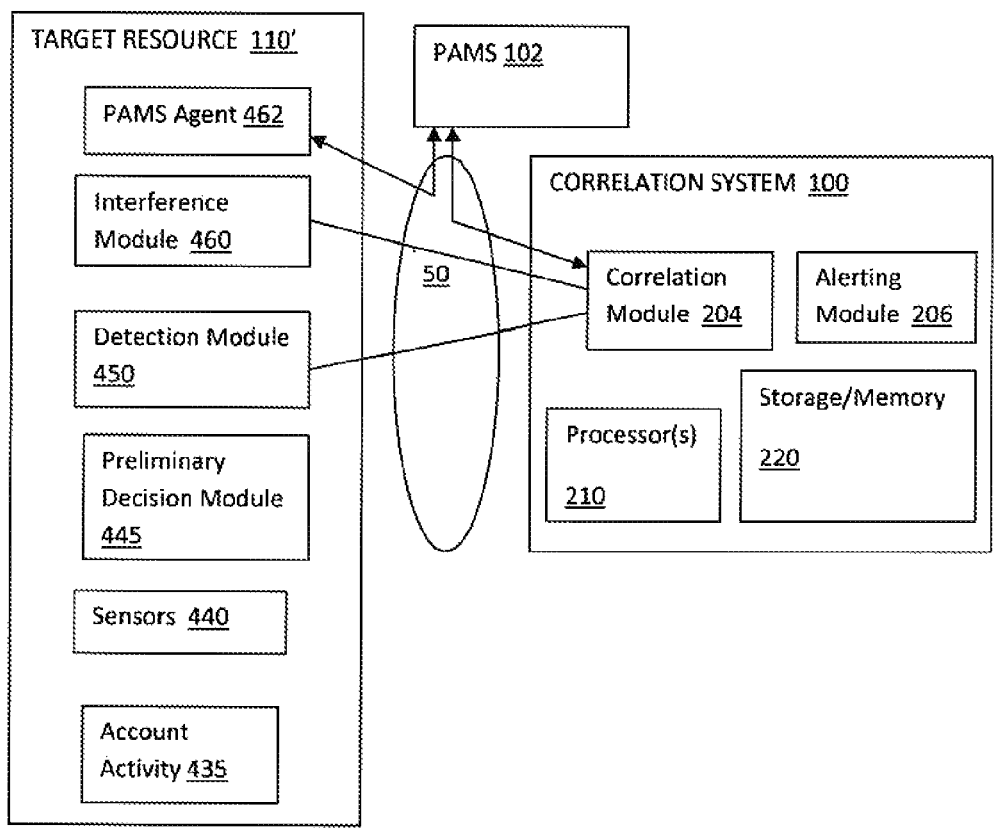

The correlation module 204 is configured to receive, or otherwise obtain, data from the target resource 110' (FIGS. 3A, 4A-1, 4A-2), over the network 50, from a detection module 350 (FIG. 3A), 450 (FIGS. 4A-1, 4A-2). The received or obtained action data corresponds to a detected action from a client associated with the target resource 110'. The action data is sent from the detection module 350, 450 associated with the target resource 110', to the correlation module 204, of the correlation system 100, where the action data is received as input. Alternately, the detection module 350, 450 can allow the correlation module 204 access to the action data, such that the correlation module 204 pulls the action data from the detection module 350, 450.

The correlation module 204 is configured to receive, or otherwise obtain credential retrieval data from PAMS 102. The correlation module 204 obtains the credential retrieval data corresponding to the specific target resource, for example, target resource 110', from PAMS 102, by either pulling it from PAMS 102, or having it pushed (sent) by PAMS 102. The pulling (retrieving) or pushing (sending) of the credential retrieval data is in accordance with rules and policies stored in PAMS 102. The credential retrieval data is, for example, indicative of one or more historical credential retrieval actions associated with network resources, including target resources 110'.

The correlation module 204 pulls or retrieves the aforementioned credential retrieval data, once the action data is received from the detection module 350. Alternatively, PAMS may push the credential retrieval data to the correlation module 204 independently, for example, when a credential was retrieved from PAMS 102 or when a policy for activity was retrieved or checked on PAMS 102.

The correlation module 204 is programmed to analyze the received and/or obtained action data, with the obtained credential retrieval data for correlations, for example, the presence or absence of such correlations. The correlations are, for example, indicative of an authorization status of the action, i.e., authorized or unauthorized, associated with the resource, such as the target resource 110'. The correlation module 204 may also include storage media 220 to serve as a repository for the correlations or indications of the absence thereof, for each correlation analysis performed by the correlation module 204.

For example, if the action associated with the target resource, represented by the action data received from the detection module 350, 450, was performed in accordance with the credential retrieval data from PAMS 102, the actions are correlated, and considered legitimate. For example, one possible correlation is to check that there exists credential retrieval data for a privileged account associated with a resource 110' that is timed before the resource 110' was accessed using the same privileged account. Accordingly, the correlation module 204 takes minimal, if any, further action. Such minimal action may include recording the correlation in the repository of the correlation module 204 and/or the storage/memory 220.

Alternately, for example, if the action associated with the target resource 110', represented by the action data received from the detection module, was not performed in accordance with the credential retrieval data from PAMS 102, the actions are not correlated and may indicate illegitimate activity. For example, if there is no record in the credential retrieval data of a privileged account credential retrieval for a target resource and there is a detected privileged action on the target resource, this can be considered "non-correlation," which may indicate illegitimate action. Accordingly, the correlation module 204 takes further action. Such further action may include signaling the alerting module 206 to issue alerts. Further action may also include signaling the interference module 360 to interfere with the operation of the target resource 110'. This further action may also include recording the absence of the correlation in the repository of the correlation module 204 and/or the storage/memory 220.

The alerting module 206 receives information, including data from the correlation module 204 and sends an alert to locations inside and outside of the correlation system 100. The alert may be, for example, in accordance with a predetermined policy, stored for example in PAMS 102. The alerts can be sent to numerous locations outside of the correlation system 100, including, for example, user interfaces, proprietary and non-proprietary, organizational security information and event management system, e-mail accounts, cellular and regular telephones, and the like. The alerting module 206, while shown, is optional.

Attention is now directed to FIG. 3A, which shows the correlation system 100 in operation with a detection module 350 and an interference module 360 deployed at the target resource 110'. This combination of the correlation system 100, detection module 350 and optional interference module 360 is designed for detecting actions which involve access to the network resource 110'. The detection module 350 and interference module 360 link to the correlation system 100, through the correlation module 204, via the network 50.

Alternately, the detection module 350 and interference module 360 may be located remotely from the network resource 110', for example, linked to the target resource 110' and the correlation system 100 via the network 50. The interference module 360 is optional, and need not be present. The detection module 350 and the interference module 360, although shown as single components for representative purposes, may be multiple components.

The detection module 350 functions to detect actions associated with the target resource 110'. The actions are detected by the detection module 350 monitoring actions associated with the target resource 110', for example by polling the target resource 110' at regular intervals, or being linked to components which detect action upon its occurrence. The detection module 350 converts the detected actions into action data, which is reported to the correlation module 204. Alternately, the detection module 350 allows the correlation module 204 access to the action data. The correlation module 204 then pulls the action data from the detection module 350.

The actions detected by the detection module 350 include those associated with access to the target resource 110', for example, logins and attempted logins (collectively referred to hereinafter as "logins"), represented by box 335. The detection module 350 is programmable such that it monitors all logins (box 335), and reports action data associated with these detected logins to the correlation module 204. Alternately, the detection module 350 is programmable to send action data for only selected logins, selected in accordance with various rules and policies. For example, the selected logins and login attempts may be those associated with privileged accounts for the target resource 110'.

As an example of the detection module 350 sending action data associated with selected logins, when the target resource is a machine with a Windows® operating system, the detection module 350 can be configured to send only local administrator or domain administrator logins to the correlation module 204. The detection module will not send action data of regular, non-privileged, user logins to the correlation module 204.

The detection module 350 detects the logins by receiving notifications on logins to specific accounts (for example, corresponding to users, system administrators and the like for the target resource 110'), or by reading connection logs for the target resource 110'. For example, when the target resource 110' is a machine with a Linux® operating system, the detection module 350 detects logins by configuring the account login module to send "syslog" messages when a user 20 (FIG. 1) logs on to the target resource 110'.

In another example, when the target resource 110' is a machine with a Windows® operating system, the detection module 350 may read the event log (not shown) of the logins (box 335), or configure an event viewer (not shown) associated with the logins (box 335), to send messages on logins and attempted logins. In yet another example, a social network account can be configured to send e-mail notifications for every connection and then, the detection module 350 receives all of the e-mail notifications of the logins and login attempts. The detection module 350 converts these e-mail notifications to action data, and sends action data for each login, or selected logins to the correlation module 204.

The optional interference module 360 is designed to interact with the target resource 110', and, for example, terminate an action, including access to or activity associated with or on the target resource 110'. Additionally, the interference module 360 can enforce a limitation on the target resource 110', limiting the activity which can be performed on the target resource 110', as well as raise an alert that the target resource 110' is being used in an unauthorized manner. The actions of the interference module 360 are such that by interfering with the action being performed in association with or on the target resource 110', damage to the target resource 110' can be prevented. The interference module 360 is linked to the correlation system 100 via the correlation module 204, which signals the interference module 360 to take appropriate action.

Figure 3B:
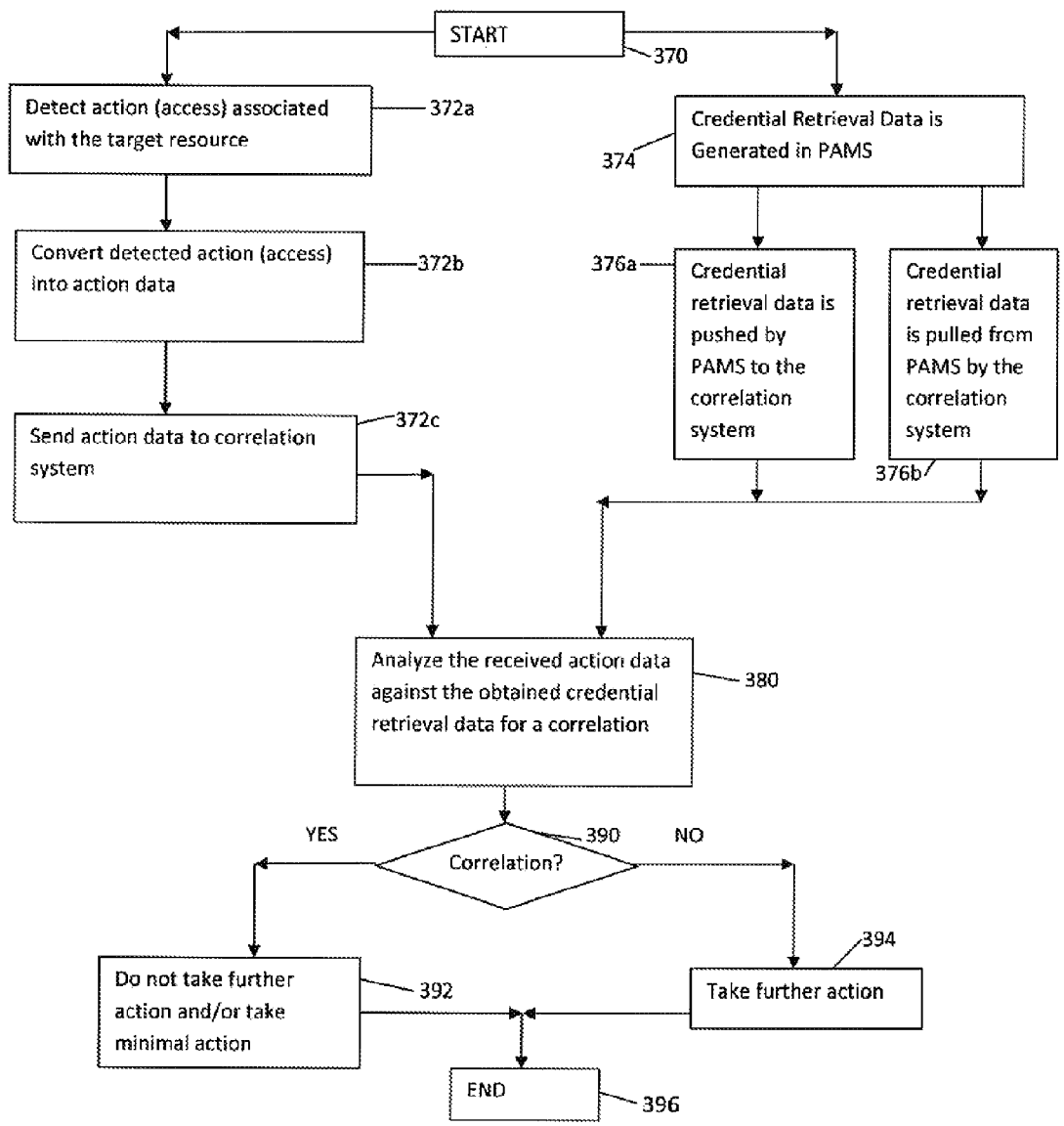
FIG. 3B is flow diagram of a process performed in the environment of FIG. 3A.

Attention is now directed to FIG. 3B, which is a flow diagram detailing a computerized process performed by the correlation system 100 in accordance with an embodiment of the disclosed subject matter. Reference is also made to elements shown in FIG. 3A and described above. The process begins at block 370.

The process moves to block 372a, where action is detected associated with the target resource 110'. The detection is typically performed by the detection module 350. The detected action is, for example, access, such as a login or attempted login to the target resource 110' by a user. This subsequent login session is known as an authentication session, as the credentials for accessing the target account, e.g., the privileged account, are authenticated. The authentication login session is the detected action associated with the target resource 110'.

At block 372b, the detected action, for example, the aforementioned access, is converted into action data, representative of the detected action (the aforementioned access, the login or attempted login). The process moves to block 372c, where, for example, the detection module 350 sends the action data to the correlation system 100, specifically, the correlation module 204. The process moves to block 380.

Returning to block 370, and in parallel to blocks 372a-372c, credential retrieval data is generated in PAMS, at block 374. This credential retrieval data includes information on credential retrieval for the target account associated with the target resource 110', by the user. At block 376a, PAMS 102 pushes the credential retrieval data from block 374 to the correlation module 204 of the correlation system 100. Alternately, at block 376b, the correlation module 204 of the correlation system 100 pulls the credential retrieval data from PAMS 102. The process moves to block 380.

The credential retrieval data may also be a lack of credential retrieval data. By this, it is meant that if the user did not retrieve credentials for the target account, there may not be any corresponding records in PAMS 102. The credential retrieval data may also be a lack of relevant credential retrieval data. "Relevant" credential retrieval data is as defined in PAMS 102 and/or the correlation system 100. Typically, relevancy is time-dependent. For example, credential retrieval data is considered relevant if it was generated or created up to 30 minutes before being sent to the correlation module 204.

The process moves to block 380, where the correlation module 204 analyzes the received (or obtained) action data of the detected action, for example, the access, against the obtained credential retrieval data for a correlation. The correlation is determined in accordance with rules and policies of the correlation system 100. For example, the data representative of the authentication login session is compared against the record (credential retrieval data) to verify that the credentials were indeed retrieved from PAMS 102 prior to being used to authenticate to target resource.

The process moves to block 390, where it is determined if there is a correlation, for example, between the examined items. If the items compare favorably, in accordance with the rules and policies of the correlation system 100, and, for example, there is sufficient matching of the items, in accordance with the rules and policies of the correlation system 100, there is a correlation. The process moves to block 392, where further action is not taken, as this access is authorized. In this case, the authentication login session continues and/or the user access to the target resource remains uninterrupted. Additionally, the correlation may be recorded, in the repository of the correlation module 204 and/or the storage/memory 220 of the correlation system 100.

Turning back to block 390, if there is not a correlation between the examined items, for example, they do not compare favorably in accordance with the rules and policies of the correlation system 100, the process moves to block 394. At block 394, further action is taken, as this access is unauthorized.

This further action may include the correlation module 204 outputting signals and the like, to the alerting module 206, triggering the alerting module 206 to issue alerts, to locations over numerous communications modes that an unauthorized access was made to the target resource 110'. The correlation module 204 can also output signals, and the like to the interference module 360, if present, triggering interference with the operation of the target resource 110', including, for example, terminating the access of the user 20, altering the target resource's 110' performance, and/or terminating its operation. This further action may also include recording the absence of the correlation in the repository of the correlation module 204 and/or the storage/memory 220.

From either block 392 or block 394, the process proceeds to block 396, where it ends.

As an example, a possible use-case for the above described process of FIG. 3B is presented. Here, a user has accessed the target resource 110', and logged in using the relevant privileged account, but has not retrieved the credentials for the login to the privileged account through PAMS 102. In this case, the access is detected at block 372a, the access is converted into action data at block 372b, and the action data of this access is sent to the correlation module 204 of the correlation system, at block 372c. The correlation module 204 then receives the action data of this access, at block 380.

The correlation module 204, at blocks 374, and 376a, 376b has not obtained any credential retrieval data for the access to the privileged account for the target resource 110', and PAMS 102 cannot find any record of the credential retrieval data, i.e., there is no record of a relevant request to retrieve credentials for the privileged account from PAMS 102, and/or there is no record that the credentials for the privileged account were retrieved in a relevant period through PAMS 102. A "relevant" request is as defined in PAMS 102 and/or the correlation system 100. Typically, relevancy is time-dependent. For example, a request will be considered relevant if it occurred up to 30 minutes before the account was accessed on target resource. In this example, a request for credentials for the privileged account that happened a day before the login to target resource will not be considered relevant and therefore would not result in a correlation.

The correlation module 204 performs an analysis for a correlation, at block 380, but at block 390, cannot determine the presence of a correlation. This is because the credential retrieval data indicated that there were not any records for a relevant request to enter PAMS 102 to obtain the credentials for the privileged account, and/or that the credentials for the privileged account were retrieved in the relevant period through PAMS 102. Absent a correlation, at block 390, this is indicative of an unauthorized access to the target resource 110'.

The process then moves to block 394, where further action is taken. This further action may include activating the interference module 360, if present, to interfere with the operation of the target resource 110' (such as by terminating the user's 20 session or otherwise interfering with the target resource 110') to prevent it from sustaining any damage from actions of the user 20. This further action may also include signaling the alerting module 206, if present, to issue alerts, as described above. The process then ends at block 396.

Attention is now directed to FIGS. 4A-1 and 4A-2. Similar components to those of FIG. 3A are increased by "100," and operate similarly to those components disclosed above and shown on FIG. 3A, with differences noted below.

FIG. 4A-1 shows the correlation system 100 in operation with sensors, represented by box 440, a preliminary decision module 445, a detection module 450 and an interference module 460, deployed at the target resource 110'. This combination of the correlation system 100, sensors 440, preliminary decision module 445, detection module 450 and optional interference module 460 is designed for detecting actions which involve activity (account activity represented by box 435) associated with the target resource 110'. The detection module 450 and interference module 460 (optional) are in accordance with the respective detection module 350 and interference module 360, detailed above, with differences specifically noted below. As shown in FIG. 4A-1, the detection module 450 and the interference module 460 link to the correlation system 100, through the correlation module 204, via the network 50, in accordance with that described above for the detection module 350 and interference module 360.

The sensors 440 detect activity, such as account activity (box 435) associated with the target resource 110'. The sensors 440 are implemented through mechanisms, such as hooks, monitors, system calls, and the like.

The sensors 440 are employed to detect processes and commands being performed with the target resource 110' via the account therefor, e.g., a privileged account. The sensors 440 are also used to detect activities associated with the network resource 110' which require high permissions, such as a non-privileged account holder performing activities associated with the target resource 110' which are reserved for privileged account holders for the target resource 110'. Sensed sensitive operations, on which the aforementioned activity can be detected, may include firewall management, user creation, driver installs, file accesses and the like.

The sensors 440 also function to detect interactions between processes being performed associated with the target resource 110'. This includes, for example, detecting the launch of a privileged process by a non-privileged user for the target resource 110'.

This also includes the sensors 440 detecting interactions between user processes with low privileges, such as those performed for a regular account for the resource, and privileged processes, those processes which can only be performed with a privileged account for the target resource 110'. For example, a transmission of information, data, etc. from a non-privileged process to a privileged process, can be detected. Detecting activity for the aforementioned situation is effective, for example, in discovering attacks which employ privileged processes, to establish covert communication channels.

The preliminary decision module 445 applies logic, rules, policies and the like, internal to the preliminary decision module 445 or external thereto, or combinations thereof, to the activity detected by the sensors 440. The preliminary decision module 445 then renders a preliminary decision whether the detected activity is relevant, and accordingly, whether the detected activity, or data representative thereof, should be passed to the detection module 450 (for subsequent reporting to the correlation module 204). For example, the logic may evaluate parameters such as the processes involved, the sensitivity of the privileged operation, the privileged/non-privileged status of the account holder performing the activity, other parameters, and combinations thereof. For example, all privileged activity performed by a specific user with a non-privileged account may be considered relevant, and accordingly, the preliminary decision module 445 would send this activity, or data representative thereof, to the detection module 450.

The detection module 450 is linked to the preliminary decision module 445, and is in electronic and/or data communication therewith. The detection module 450 converts the detected activity to a data representation, for example, action data for the activity. The detection module 450 functions in accordance with that described for detection module 350, for detected activity. The interference module 460 functions in accordance with the interference module 360, as detailed above.

FIG. 4A-2 is similar to FIG. 4A-1, with similar components having the same element numbers. FIG. 4A-2 additionally includes a PAMS agent 462 at the target resource 110'. The PAMS agent 462 is linked to PAMS 102, via the network 50, either directly or indirectly, but may be directly connected to PAMS 102.

The PAMS agent 462 provides on-demand privilege escalation (defined above), for example, by PAMS 102. The PAMS agent 462 is installed on the target resource 110' to detect requests to use a privileged account, and to provide the privileges associated with the privileged account on-demand. An exemplary PAMS solution that employs such agent 462 is the On-Demand Privileges Manager, available from CyberArk, www(dot)cyberark(dot)com.

Figure 4B:
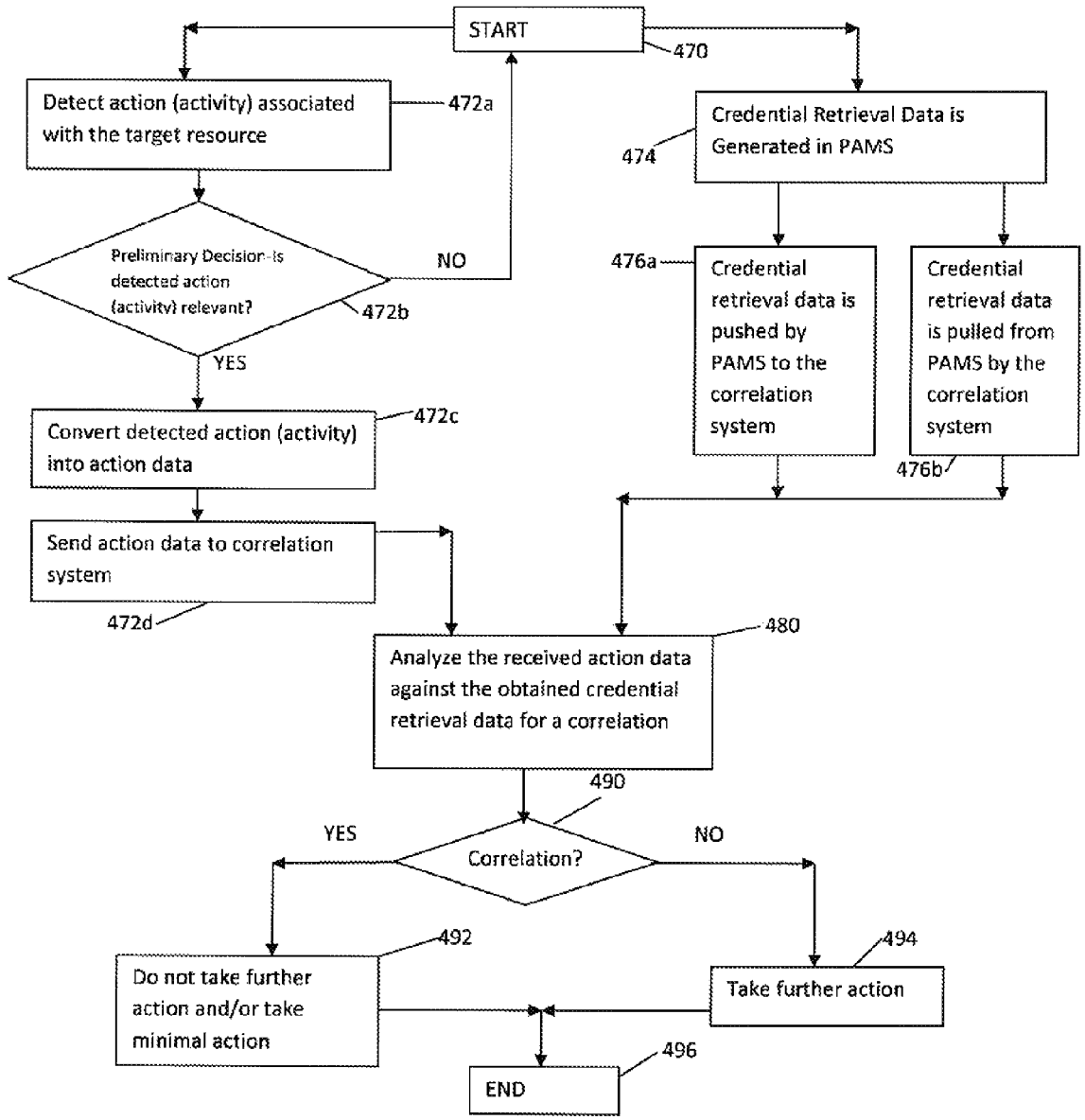
FIG. 4B is a flow diagram of a process performed in the environment of FIGS. 4A-1 and 4A-2.

Attention is now directed to FIG. 4B, which is a flow diagram detailing a computerized process performed by the correlation system 100 in accordance with an embodiment of the disclosed subject matter. Reference is also made to elements shown in FIGS. 4A-1 and 4A-2, and described above. Numerals for similar processes/subprocesses to those of the process of FIG. 3B are increased by one hundred, and operate similarly to those components disclosed above and shown on FIG. 3B, with differences noted below.

The process starts at block 470. The process moves to block 472a, where action is detected associated with the target resource 110'. The detection is typically performed by the sensors 440. The detected action is, for example, activity associated with the target resource 110' by a user 20, who has accessed the target resource 110' and is performing an activity reserved for privileged account holders for the target resource 110' (a "privileged activity"). The detected activity could be a privileged activity, for example, an attempt to run a privileged process or execute a privileged command associated with the target resource 110'.

At block 472b, a preliminary decision is made as to the relevance of the detected activity, by the preliminary decision module 445. This decision as to the relevance is rules and policy based. If the detected activity is relevant, the process moves to block 472c. Otherwise, the detected activity is not relevant and the process returns to the start, block 470. For example, as the rule considers privileged activity to be relevant, the detected activity is relevant, and the process moves to block 472c.

At block 472c, the detection module 450 has received the action, for example, the activity of the user's 20 attempt to perform a privileged activity associated with the target resource 110'. The detection module 450 converts the received action into action data, for example, data representative of the activity of the user's 20 attempt to perform a privileged process associated with the target resource 110'.

The process moves to block 472d, where, for example, the detection module 450 sends the action data to the correlation system 100, specifically to the correlation module 204. The process moves to block 480.

Returning to block 470, and in parallel to blocks 472a-472d, credential retrieval data is generated in PAMS 102, at block 474. This credential retrieval data corresponds to the action data, which, for example, is the activity data, the data representative of the activity of the user's 20 attempt to perform a privileged activity associated with the target resource 110'. The process moves to parallel blocks 476a and 476b.

At block 476a, PAMS 102 pushes the credential retrieval data from block 474 to the correlation module 204 of the correlation system 100. Alternately, at block 476b, the correlation module 204 of the correlation system 100 pulls the credential retrieval data from PAMS 102. The process moves to block 480.

At block 480, the correlation module 204 analyzes the received (or obtained) action data of the detected action, for example, the activity, e.g., access, against the obtained credential retrieval data for a correlation. The correlation is determined in accordance with rules and policies of the correlation system 100. For example, the system can check that there exists relevant credential retrieval data prior to the performed activity.

Turning to block 490, there is a correlation that credentials for the privileged account used to perform the activity were retrieved prior to the activity being performed. Since there is a correlation, the process moves to block 492, where further action is not taken, as this activity, e.g., performing the privileged activity, is authorized. The user's activity associated with target resource 110' remains uninterrupted. As a result, the user is permitted to perform the detected process. Additionally, the correlation may be recorded, in the repository of the correlation module 204 and/or the storage/memory 220 of the correlation system 100.

Returning to block 490, there is not a correlation when there is no relevant credential retrieval data for the privileged account used to perform the privileged activity. This may indicate that the user achieved "privilege escalation" not through the approved workflow (the approved workflow being requesting credentials from PAMS 102 to use the privileged account).

Absent a correlation, the process moves to block 494. At block 494, further action is taken, as the activity is unauthorized. This further action may include the correlation module 204 signaling the alerting module 206, if present, to issue alerts, and signaling the interference module 460, if present, to interfere with the operation of the target resource. This further action may also include recording the absence of the correlation in the repository of the correlation module 204 and/or the storage/memory 220.

From either block 492 or block 494, the process proceeds to block 496, where it ends.

Figure 4C:
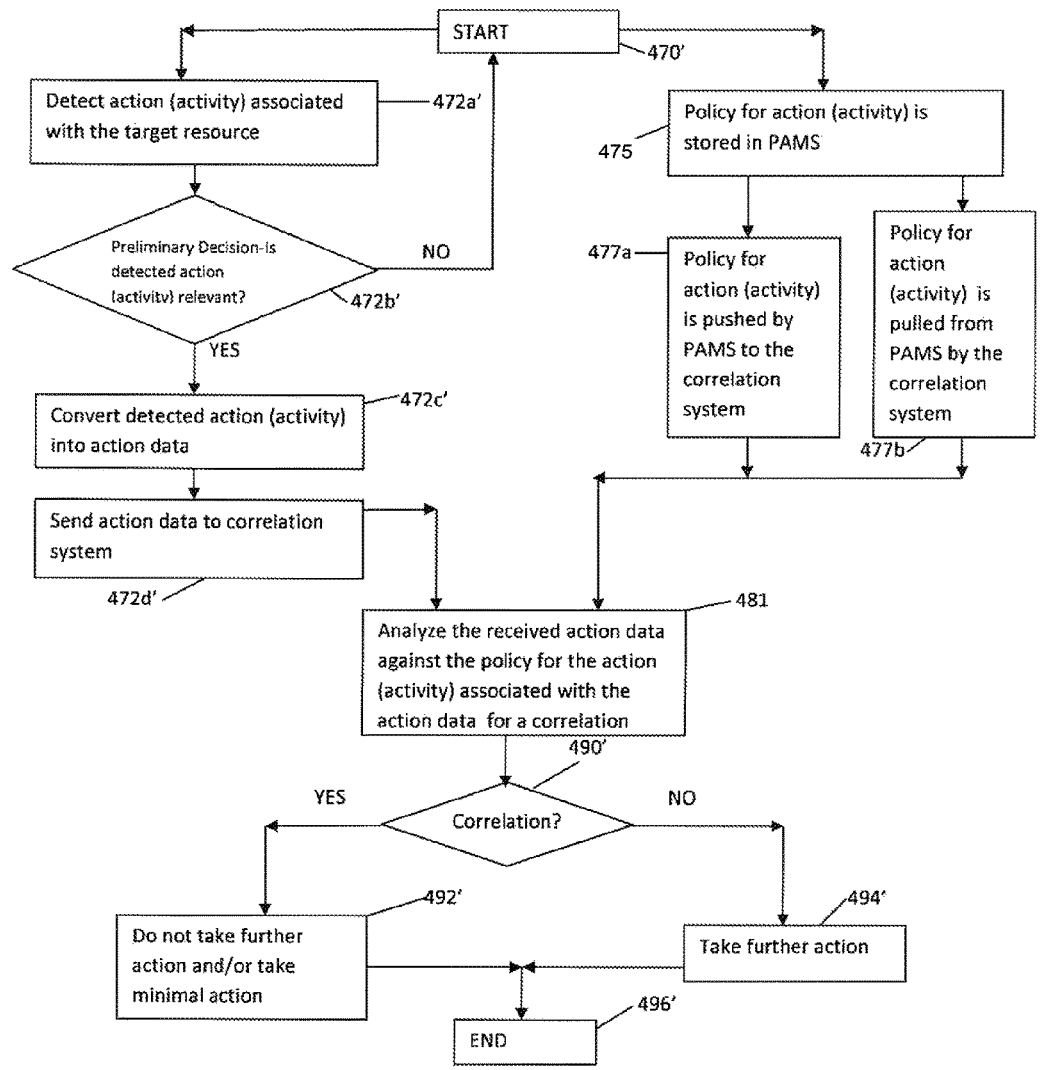
FIG. 4C is a flow diagram of a process performed in the environment of FIGS. 4A-1 and 4A-2.

Attention is now directed to FIG. 4C, which is a flow diagram detailing a computerized process performed by the correlation system 100 in accordance with an embodiment of the disclosed subject matter. Reference is also made to elements shown in FIGS. 4A-1 and 4A-2, and described above. Similar processes/subprocesses to those of the process of FIG. 4B have primes (') after their element number, with differences noted below. Specifically, the flow diagram of FIG. 4C addresses the situation where a user is performing a process on the target resource 110', but the process is not in accordance with a policy stored in PAMS 102.

The process starts at block 470'. The process moves to block 472a', where action is detected associated with the target resource 110'. The detection is typically performed by the sensors 440. The detected action is, for example, activity associated with the target resource 110' by a user 20, who has accessed the target resource 110' and is running a process reserved for privileged account holders for the target resource 110' (a "privileged process"). The detected activity could be, for example, an attempt to perform a privileged process associated with the target resource 110'.

At block 472b', a preliminary decision is made as to the relevance of the detected activity, by the preliminary decision module 445. This decision is rules and policy based. If the detected activity is relevant, the process moves to block 472c'. Otherwise, the detected activity is not relevant and the process returns to the start, block 470'. For example, as the rule considers privileged activity to be relevant, the detected activity is relevant, and the process moves to block 472c'.

At block 472c', the detection module 450 has received the action, for example, the activity of the user's 20 attempt to perform a privileged activity, for example, running a privileged process or executing a command deemed sensitive, associated with the target resource 110'. The detection module 450 converts the received action into action data, for example, data representative of the activity of the user's 20 attempt to perform a privileged process associated with the target resource 110'.

The process moves to block 472d', where, for example, the detection module 450 sends the action data to the correlation system 100, specifically to the correlation module 204. The process moves to block 481.

Returning to block 470', and in parallel to blocks 472a'-472d', a policy or policies is/are stored in PAMS 102, at block 475. The policy(ies) correspond to the action data which, for example, is the activity data, the data representative of the activity of the user's 20 attempt to perform a privileged activity associated with the target resource 110', for which he has not gone through PAMS 102. The process moves to parallel blocks 477a and 477b.

At block 477a, PAMS 102 pushes the policy(ies) for the action to the correlation module 204 of the correlation system 100. Alternately, at block 477b, the correlation module 204 of the correlation system 100 pulls the policy(ies) for the action from PAMS 102. The process moves to block 481.

At block 481, where the correlation module 204 analyzes the received (or obtained) action data of the detected action, for example, the activity, e.g., access, against the policy(ies) for the action from PAMS 102, for a correlation. The correlation is determined in accordance with rules and policies of the correlation system 100. For example, the data representative of the activity of the user 20 performing a privileged activity associated with the target resource 110' is compared against a policy allowing or disallowing this user this process, and/or determining, if the process is performed in accordance with an authorized workflow from PAMS 102.

Turning to block 490', there is a correlation when the policy from PAMS 102 allows the user to perform the detected action. For example, the detected action is being performed in accordance with an authorized workflow. Since there is a correlation, the process moves to block 492', where further action is not taken. Additionally, the correlation may be recorded, in the repository of the correlation module 204 and/or the storage/memory 220 of the correlation system 100.

Returning to block 490', there is not a correlation when the action being performed is not in line with the policy(ies) from PAMS 102. The user is performing unauthorized actions on the target resource 110'. Correlations are also not present where there is an unauthorized performance of a PAMS authorized process. Here, the user 20 lacks proper permissions in accordance with the policy(ies) of PAMS 102, but performs the process in accordance with a PAMS 102 authorized workflow.

Absent a correlation, the process moves to block 494'. At block 494', further action is taken, as the activity is unauthorized. This further action may include the correlation module 204 signaling the alerting module 206, if present, to issue alerts, and signaling the interference module 460, if present, to interfere with the operation of the target resource. This further action may also include recording the absence of the correlation in the repository of the correlation module 204 and/or the storage/memory 220.

From either block 492' or block 494', the process proceeds to block 496', where it ends.

The above systems and processes are also suitable for use with network resources that are not based on privileged accounts and authorized privileges for various actions and access to computer resources.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, including correlation modules and optional alerting modules, with associated processors and storage/memory, will be developed and the scope of the term module, processors and storage/memory is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method performed by a computer system for detecting an unauthorized use of network resources, comprising:
   using at least one hardware processor of a server connected to a network for executing a code, the code comprising code instructions for:
   receiving action data indicating use of an account for performing an activity associated with a target resource accessible by the account over said network;
   obtaining, over said network from an account management system, credential retrieval data documenting credential retrieval actions to retrieve credentials for using said network resources;

determining, from said credential retrieval data, an absence of a providing of credentials to said account by said account management system in response to a credential retrieval request from said account and prior to said use of said account for performing said activity; and in response to said determining said absence of said providing of credentials by said account management system to said account, automatically limiting use of said target resource by said account.

2. The method of claim 1, wherein the action data is received over the network.

3. The method of claim 1, further comprising, in response to determining a presence of a providing of credentials by said account management system to said account, authorizing said activity.

4. The method of claim 1, further comprising providing a notification to one or more machines indicating an unauthorized use of said account when said absence of said providing of credentials by said account management system to said account is determined.

5. The method of claim 1, further comprising controlling access to the target resource.

6. The method of claim 1, further comprising controlling the activity associated with the target resource.

7. The method of claim 6, wherein said absence of said providing of said credentials by said account management system to said account is indicative of an authorization status of said activity associated with said target resource.

8. The method of claim 6, wherein the activity includes a privileged use of the target resource by a non-privileged user process.

9. The method of claim 1, wherein the account is a privileged account.

10. The method of claim 9, wherein said privileged account is managed by said account management system.

11. The method of claim 1, wherein the target resource is selected from the group consisting of: servers, computers, computer systems, computer devices, mobile devices, network devices, databases, computer components, computer modules, machines, engines, software and applications.

12. The method of claim 1, wherein said credential retrieval data includes at least one of:
records documenting historical credential retrieval actions,
records documenting historical certificate or password requests,
records documenting historical requests to perform actions associated with the target resource, and
activity logs of credential requests.

13. A computer system for detecting an unauthorized use of network resources, comprising:
a non-transient storage medium storing code instructions; and
a hardware processor coupled to said storage medium and configured to execute said stored code, the code comprising code instructions for:
receiving action data indicating use of an account for performing an activity associated with a target resource accessible by the account over a network;
obtaining, over said network from an account management system, credential retrieval data documenting credential retrieval actions to retrieve credentials for using said network resources;

determining, from said credential retrieval data, an absence of a providing of credentials to said account by said account management system in response to a credential retrieval request from said account and prior to said use of said account for performing said activity; and in response to said determining said absence of said providing of credentials by said account management system to said account, automatically limiting use of said target resource by said account.

14. The computer system of claim 13, wherein the hardware processor is adapted to execute said code for: authorizing the activity when a presence of said providing of credentials by said account management system to said account is determined.

15. The computer system of claim 13, wherein the hardware processor is adapted to execute said code for: controlling the use of the account by not authorizing the activity when said absence of said providing of credentials by said account management system to said account is determined.

16. The computer system of claim 15, wherein, when said absence of said providing of credentials by said account management system to said account is determined, said hardware processor is adapted to execute said code for at least one of:
changing the operation of the target resource; and
informing a computerized module, configured for sending alerts of unauthorized activity to locations internal and external to the computer system, to send at least one alert of said unauthorized activity associated with the target resource.

17. The computer system of claim 13, wherein said credential retrieval data includes at least one of:
records documenting historical credential retrieval actions,
records documenting historical certificate or password requests,
records documenting historical requests to perform actions associated with the target resource, and
activity logs of credential requests.

18. A computer usable non-transitory storage medium having a computer program embodied thereon for causing a programmed system to determine an unauthorized use of network resources by performing the following steps when such program is executed on the system, the steps comprising:
receiving action data indicating use of an account for performing an activity associated with a target resource accessible by the account over a network;
obtaining, over said network from an account management system, credential retrieval data documenting credential retrieval actions to retrieve credentials for using said network resources;
determining, from said credential retrieval data, an absence of a providing of credentials to said account by said account management system in response to a credential retrieval request from said account and prior to said use of said account for performing said activity; and
in response to said determining said absence of said providing of credentials by said account management system to said account, automatically limiting use of said target resource by said account.

* * * * *